Sept. 18, 1951 G. P. JOHNSON 2,568,071
SPRING SEAT CONSTRUCTION
Filed April 25, 1946 2 Sheets-Sheet 1

INVENTOR.
Gustave P. Johnson,
BY Brown, Jackson,
Boettcher & Dienner
attys.

Sept. 18, 1951 G. P. JOHNSON 2,568,071
SPRING SEAT CONSTRUCTION
Filed April 25, 1946 2 Sheets-Sheet 2
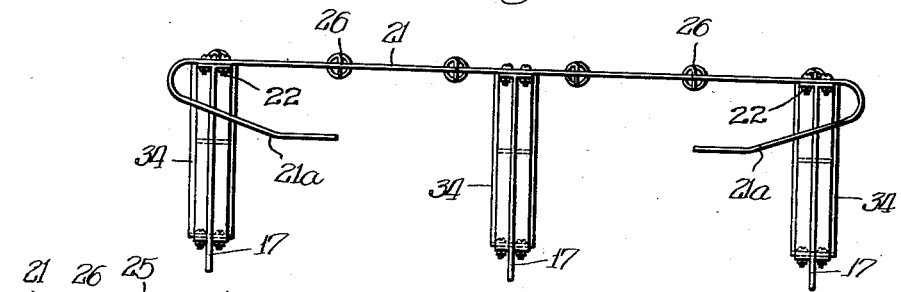
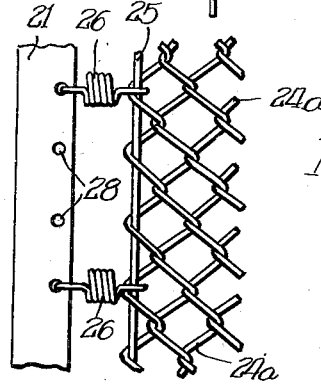
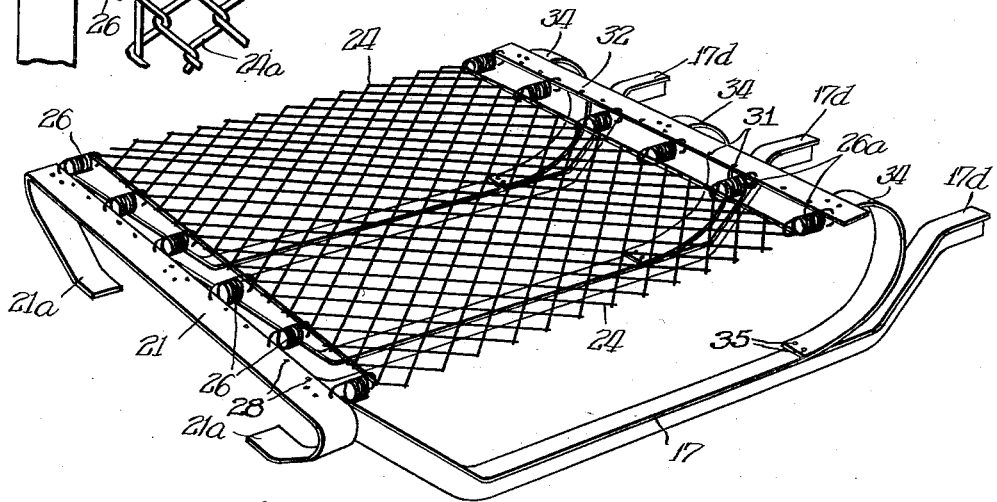
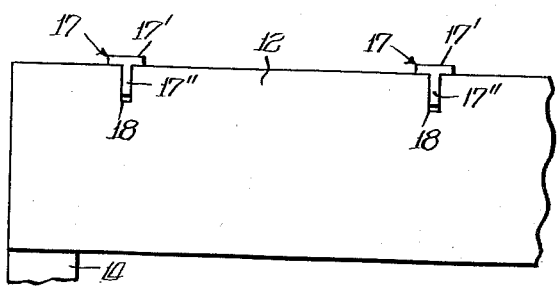
INVENTOR.
Gustave P. Johnson,
BY Brown, Jackson,
Boettcher & Dienner
Attys.

Patented Sept. 18, 1951

2,568,071

UNITED STATES PATENT OFFICE 2,568,071

SPRING SEAT CONSTRUCTION

Gustave P. Johnson, Waukegan, Ill.

Application April 25, 1946, Serial No. 664,905

10 Claims. (Cl. 155—179)

The present invention relates to an improved spring seat construction designed primarily for chairs or any like furniture where a spring seat is desired. Also, as will hereinafter appear, my improved spring seat construction is readily adaptable to use in automobile seats, airplane seats, and vehicle seats in general.

One of the features of this improved spring seat construction is that it is an all-metal, self-contained unit which can be literally dropped into place in practically any conventional chair frame. At most, the only preparatory work necessary to be done on the chair frame to adapt it to receive this spring seat is to provide some spaced saw slots in the rear rail of the chair frame, or to provide some spaced blocks or like spacing devices on this rear rail to prevent lateral shifting of the spring seat supporting bars.

Another feature of the invention resides in providing the spring seat with a yieldable front edge of improved construction. This yieldable or resilient front edge is preferably obtained by arranging the spring seat assembly for vertical pivotal movement as a unit about the rear rail of the chair frame, and then interposing improved spring means between the front edge of this spring seat assembly and the front rail of the chair frame, whereby the yieldable front edge is obtained by this spring supported pivotal movement of the entire spring assembly as a unit.

The seat surface of the spring assembly is afforded by a section of wire netting, and another feature of the invention resides in an improved arrangement of leaf springs for connecting the rear edge of this wire netting with the fore and aft supporting bars of the spring seat assembly.

Other feature, objects and advantages of the invention will appear from the following detail description of one preferred embodiment thereof. In the accompanying drawings illustrating such embodiment:

Figure 3 is a front edge view of the spring seat construction;

Figure 4 is a perspective view of the unit;

Figure 5 is a fragmentary rear detail view showing the mounting of the spring seat support bars in the slots in the rear rail of the chair frame; and Figure 6 is a fragmentary plan view of the chain link type of wire netting which I preferably employ for the seat surface.

Figure 1:
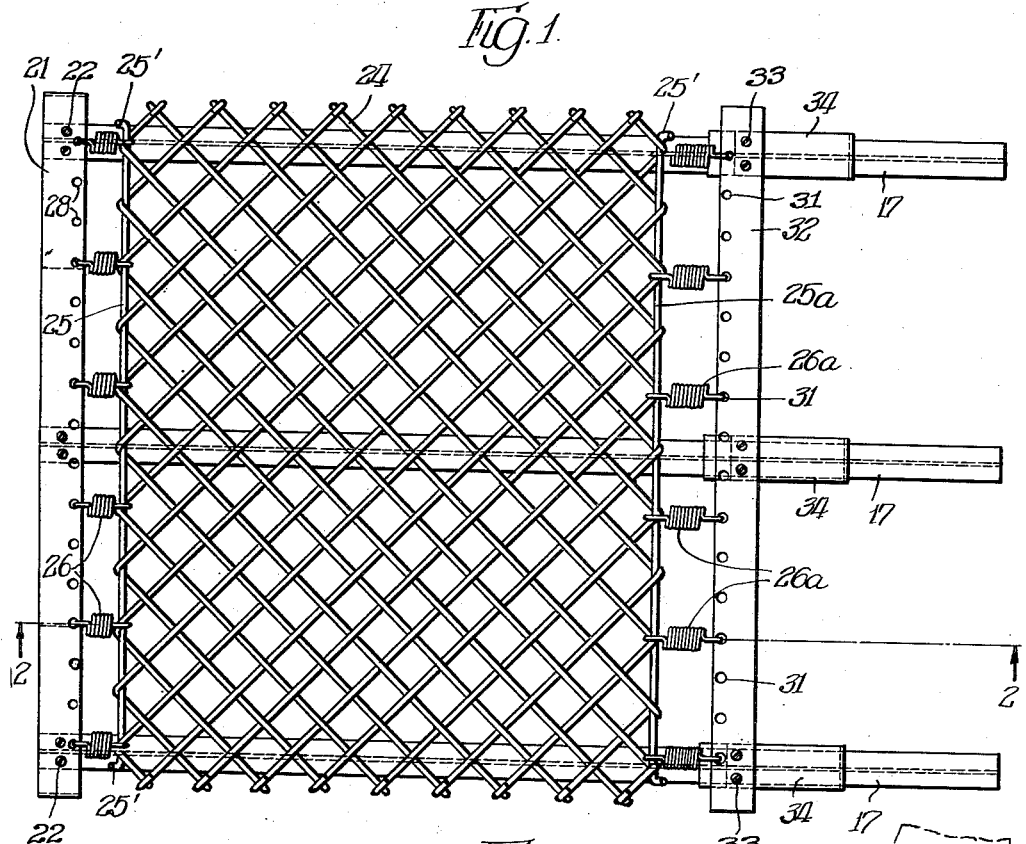
Figure 1 is a plan view of the spring seat construction, the mesh of the wire netting being illustrated diagrammatically.
Figure 2:
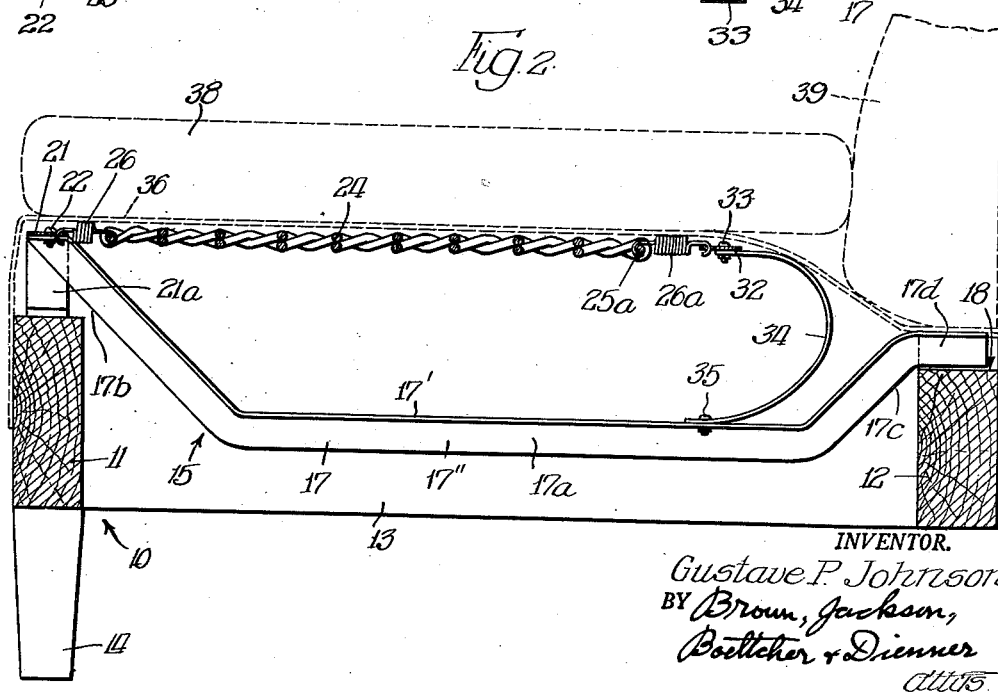
Figure 2 is a fore and aft or longitudinal sectional view taken approximately on the plane of the line 2—2 of Figure 1 showing the spring seat construction mounted in a chair frame.

Referring first to Figure 2, the main supporting frame for receiving the spring seat construction is designated 10 in its entirety, this main frame comprising a front supporting rail 11 and a rear supporting rail 12. In the case of a conventional chair or like piece of furniture, these front and rear rails 11 and 12 would usually be constructed of wood, and, accordingly, I have illustrated them as being of wood in Figure 2, but it will be understood that they might be made of a plastic material, or possibly of metal in the case of an automobile seat or an airplane seat. The side rails of a conventional chair frame are indicated at 13 and the corner legs at 14.

The improved spring seat construction is a self-contained unit, designated 15 in its entirety, and is adapted to be dropped into place on the front and rear rails 11 and 12 of the main supporting frame 10. The several elements which make up this spring assembly 15 all have mounting upon or attachment to a sub-frame comprising three parallel supporting bars 17 which extend fore and aft relatively to the front and rear main frame rails 11 and 12. These parallel supporting bars 17 are preferably of T-shaped cross section having the cross bar portion 17' of the T disposed horizontally and the stem portion 17'' extending downwardly therefrom. Referring to Figure 2, each of these supporting bars 17 is formed with a dropped central portion 17a, from the front of which the bar slopes upwardly, as indicated at 17b, and from the rear of which the bar also slopes upwardly at 17c and then extends horizontally rearwardly as indicated at 17d. Such angular form of support bar is preferably obtained by bending a straight bar, but it may also be obtained by using separate straight sections welded together in the angular relation shown. Referring now to the horizontally extending rear portion 17d, it will be noted that this portion is adapted to have bearing support on the rear frame rail 12 of the chair in such manner that the entire bar 17 can tilt upwardly and downwardly around this bearing support on the rail 12. As best shown in Figure 5, the top edge of the rail 12 is provided with three equally spaced saw slots 18 for receiving the vertical flanges of the three supporting bars 17, the sides of these slots defining locking shoulders which hold the rear ends of the supporting bars against lateral shifting movement while still permitting free vertical rocking freedom of the supporting bars on the rear rail 12. The point of bearing contact may be at the bottom of the slot 18, or between the horizontal flanges of the T-bar and the adjacent top surfaces of the rail 12, the latter arrangement being preferred. I wish it to be understood that instead of providing slots 18 in this main supporting member 12, I may use spacing blocks or brackets which will define spacing shoulders adapted to hold the rear ends of the supporting bar 17 at their proper spaced distances while still permitting rocking movement of these support-bars. Such latter arrangements might be applicable to automobile seats and airplane seats. Attention is directed to the fact that rearward sliding or shifting movement of each supporting bar 17 is limited by the proximity of the downwardly bent portion 17c to the front edge of the frame rail 12. As clearly shown in Figure 2, each frame bar 17, or the entire spring seat assembly, can only shift rearwardly a slight distance before the downwardly bent portion 17c strikes the front edge of the frame rail 12. Similarly, these supporting bars 17, or the entire spring seat assembly, can only shift or slide in a forward direction through a limited distance before the upwardly bent front ends 17b strike the upper inner edge of the front rail 11.

The front ends of the fore and aft supporting bars 17 are secured to a transversely extending front attachment bar 21, this preferably being accomplished by bending the lateral flanges 17' in a forwardly extending substantially horizontal direction and securing them to the under side of the attachment bar 21 as by the bolts 22, or by rivets or welding. This attachment bar has yieldable support on the top surface of the front frame rail 11 through the medium of leaf spring ends 21a which are bent downwardly and inwardly from the ends of said attachment bar 21, as best shown in Figures 3 and 4. A suitable spring temper is given to the end portions of the bar 21, or to the entire length of the bar, when forming the leaf springs 21a as integral portions of the bar. If desired, the leaf springs 21a might be formed as separately tempered sections of stock riveted or bolted to the ends of the bar 21. The yieldability of these leaf springs is so proportioned as to give the desired resiliency to the front edge portion of the spring seat assembly. The bottom ends of the leaf springs 21a are preferably left free to slide on the top surface of the chair frame rail 11, although they may be anchored thereto if desired.

Referring now to the top supporting surface of the spring seat unit 15, this preferably consists of a section of wire netting 24. Although different types of netting may be employed, I preferably use netting of the chain link type in which the individual strands of wire 24a extend transversely of the length of the netting (i. e. extend from side to side of the chair frame) and are looped back and forth for linked connection with adjacent strands, such type of netting being illustrated and described in detail in my prior Patent No. 2,155,792, issued April 25, 1939. Such type of netting has a substantial degree of resiliency or elasticity without deformation, particularly in the direction of its length, which, in the present instance would be in the fore and aft direction of the chair. The front edge of this wire netting has a stiffening rod 25 extending through the loops of the front or end strand, the extremities of this rod being bent laterally as indicated at 25' to prevent displacement of the rod. A plurality of helical tension springs 26 having hook-shaped ends have their rear ends hooked over this stiffening rod 25, preferably at points where the end strand of the wire netting loops over the rod. The front ends of these tension springs are hooked into spaced holes 28 formed along the rear edge of the front attachment bar 21.

At the rear edge of the section of netting 24, another stiffening rod 25a similar to the rod 25 extends through the loops of the end strand of the netting, the ends of this rod being also bent over at 25' similarly to the rod 25. Hooked to the rod 25a is a series of helical tension springs 26a similar to the springs 26 but preferably slightly longer. The rear ends of the springs 26a are hooked into holes 31 punched along the front edge of a transverse attachment bar 32. This rear attachment bar is secured by bolts, pins or rivets 33 to the upper ends of curved leaf springs 34 which extend upwardly from the dropped portions of the fore and aft supporting bars 17. The lower ends of these leaf springs 34 are secured by bolts, pins or rivets 35 to the top surfaces of the bar 17 adjacent to the rear ends of their dropped portions. Said leaf springs 34 are prestressed in tension or flexure so that they tend constantly to move the rear attachment bar 32 in a rearward direction, thereby maintaining the section of wire netting 24 under continuous tension. It will be evident that these leaf springs 34 afford a free floating mounting for the rear attachment bar 32 and the rear edge of the wire netting 24. This free floating support adds very materially to the vertical resiliency of the rear portion of the surface 24. Weight which is brought to bear near the rear portion of the supporting surface of the netting 24 causes the rear attachment bar 32 to be pressed downwardly to a lower lever than the front attachment bar 21, although some of this weight may also cause some downward movement of the free floating front bar 21. Thus both the rear and front edges of the flexible supporting surface or netting 24 have a vertically movable free floating support or mounting, but the free floating support of the rear edge (25a, 32) is with respect to the movable sub-frame 15, whereas the free floating support of the front edge (25, 21) is not with respect to the sub-frame but instead is with respect to the main frame 11. Of course, it will be understood that the tension springs 26 and 26a give addtional free floating support of the netting 24 beyond or in addition to that afforded by the leaf springs 21a and 34. The number of tension springs 26 along the front edge and the number of tension springs 26a along the rear edge may be increased or diminished by adding or subtracting springs to obtain any desired degree of yieldability of the netting 24 relatively to the attachment bars 21 and 32. The rear leaf springs 34 have sufficient rigidity of attachment to the supporting bars 17 and to the transverse attachment bar 32 to enable this transverse attachment bar to function as a spacer or restraining member for maintaining the rear ends of the supporting bars 17 at their proper spacing when the spring seat unit 15 is being shipped or handled preparatory to being placed in a chair frame. It will be seen that this spring seat construction can be literally dropped into place in the chair frame. It is only necessary to bring the rear ends 17d of the supporting bars 17 into registration with the slots 18 in the rear frame rail 12, whereupon the front leaf springs 21a can then be dropped down upon the top of the front frame rails 11, as a result of which the assembly or mounting of the spring seat construction is completed. In Figure 2 I have shown a fabric covering 36 in dotted lines as extending over the spring seat unit 15, this fabric covering extending down over the outer sides of the chair frame 11, 12 and 13, as is conventional with upholstered chairs. If desired, a thin pad may be interposed between the wire netting 24 and the upholstery covering 36. Superposed over this is the conventional upper pad or cushion 38 which may be composed of felt, hair, foam rubber or any other preferred material. The back of the chair is shown as having a rear cushion 39, also of any conventional construction.

I have shown three support bars 17 as a preferred number for the average width of chair, but it will be understood that a greater or lesser number of these bars may be used, particularly for wider or narrower chairs or other furniture. The side edges of the netting 24 are preferably left entirely free. In this chain link netting, as described in detail in my prior Patent No. 2,155,792, I have found that a greater degree of resiliency is obtained, with less likelihood of the netting assuming a permanent sag, when the side edges of the netting are left free of connection with the supporting frame 10, so that all of the load is sustained in a direction substantially at right angles to the strands 24a, whereby the intermediate portion of the netting is left free to contract and expand laterally in its transverse dimension with change of load. Figure 6 fragmentarily illustrates a portion of this chain link netting in greater detail. The interlooped relation of the strands is preferably such that there is a substantial spacing between the upper and lower portions of the wire loops, which affords a considerable degree of rolling freedom between adjacent strands. Consequently the netting can be freely worked or twisted into different planes without permanently stretching or distorting the netting. By thus enabling the netting to adapt itself more readily and more resiliently to a shifting or unevenly distributed load, the flexibility and comfort of the spring seat are increased, as pointed out in my prior Patent 2,155,792. The dropped intermediate portions 17a of the sub-frame bars 17 afford ample vertical space for a large degree of downward flexure of the wire netting 24 without striking any portion of the sub-frame.

While I have illustrated and described what I regard to be the preferred embodiment of my invention nevertheless it will be understood that such is merely exemplary and that numerous modifications and rearrangements may be made therein without departing from the essence of the invention.

I claim:

1. In a spring seat for a chair or the like, the combination of a chair frame, a plurality of fore and aft supporting bars adapted to extend from front to rear of the chair frame, means for pivotally mounting the rear ends of said supporting bars on the rear of said chair frame, spring means affording a vertically movable free floating mounting of the front ends of said supporting bars on said chair frame, a section of wire netting carried by said supporting bars, and spring means affording a vertically movable free floating mounting of one edge of said wire netting on said supporting bars.

2. In a spring seat construction for chairs, the combination of a chair frame, support bars adapted to have their rear ends tiltably supported on the rear of said chair frame adjacent to the side edges of the chair, a cross member connecting the front ends of said support bars, leaf spring means adapted to carry said cross member on the front of the chair frame, a section of wire netting, and spring means connecting the front and rear edges of said netting with said support bars.

3. In a spring seat construction for a chair, the combination of a main chair frame having front and rear members adjacent the front and rear edges of the chair, a sub-frame comprising a plurality of substantially parallel support bars adapted to extend fore and aft of the main frame and with their rear ends tiltably supported on the rear member of said main frame, a front attachment bar connected to the front ends of said support bars, leaf spring means adapted to carry said front attachment bar on the front member of the chair frame, a section of wire netting, coil springs connecting the front edge of said wire netting with said front attachment bar, and leaf springs connecting the rear edge of said wire netting with said support bars.

4. In a spring seat construction for chairs, the combination of a chair frame, a plurality of substantially parallel support bars adapted to extend fore and aft of the chair frame with the rear ends thereof tiltably mounted on the rear of the chair frame, a front attachment bar connecting the front ends of said support bars, leaf spring means adapted to carry said front attachment bar on the front of the chair frame, a section of wire netting, a plurality of helical tension springs connected between said front attachment bar and the front edge of said wire netting, a rear attachment bar, a plurality of helical tension springs connected between said rear attachment bar and the rear edge of said wire netting, and curved leaf springs connecting said rear attachment bar with said support bars.

5. In a spring seat construction for chairs or the like, the combination of a chair frame, a plurality of substantially parallel support bars adapted to extend fore and aft of the chair frame, each of said support bars being of T-shaped cross section, the rear ends of said support bars being received in vertical slots in the rear member of said chair frame, said support bars having dropped intermediate portions, a front attachment bar secured to the front ends of said support bars, said front attachment bar having downwardly and inwardly curved leaf spring ends adapted to have yieldable mounting on the front member of the chair frame, helical tension springs connected to said front attachment bar, a section of wire netting connected to said helical tension springs, helical tension springs connected to the rear edge of said wire netting, a rear attachment bar connected to said rear helical tension springs, and bowed leaf springs connected between said rear attachment bar and the dropped portions of said fore and aft support bars.

6. In a spring seat construction for chairs or the like, the combination of a chair frame having front and rear members adjacent to the front and back edges of the chair, a plurality of substantially parallel support bars adapted to extend fore and aft of the chair frame, each of said support bars being of T-shaped cross section, the rear ends of said support bars being tiltably received in vertical slots in the rear member of said chair frame whereby the front ends of said support bars can rise and fall around the rear member of said chair frame, said support bars having dropped intermediate portions, said dropped intermediate portions being effective to limit any fore and aft shifting movement of said support bars relatively to said chair frame by striking adjacent edges of the front and rear members of said chair frame, a front attachment bar secured to the front ends of said support bars, said front attachment bar having downwardly and inwardly curved leaf spring ends adapted to have yieldable mounting on the front member of the chair frame to afford a yieldable front edge for the spring seat construction, helical tension springs connected to said front attachment bar, a section of wire netting connected to said helical tension springs, said wire netting being of the chain-link type with the strands of said netting extending from side to side of the chair frame and interlaced together to provide axes of relative flexing movement extending transversely of said chair frame, helical tension springs connected to the rear edge of said wire netting, a rear attachment bar connected to said rear helical tension springs, and bowed leaf springs connected between said rear attachment bar and the dropped portions of said fore and aft support bars.

7. As an article of manufacture for use in the main frame of a chair having front and rear frame members adjacent to the front and rear edges of the chair: a completely assembled spring cushion unit adapted to be placed in the chair frame as a unit, said spring cushion unit comprising a sub-frame including a plurality of fore and aft supporting bars having bearing members at their rear ends adapted to have points of rockable bearing support on said rear main frame member whereby the front end of said sub-frame can swing upwardly and downwardly about said points of rockable bearing support, spring means carried by the front end of said sub-frame adapted to bear against said front main frame member so as to afford a vertically movable free floating mounting of the front edge of said sub-frame, a section of wire netting extending across said sub-frame establishing a flexible upper supporting surface for said spring cushion unit, and helical tension springs connecting said wire netting with said sub-frame.

8. As an article of manufacture for use in the main frame of a chair having front and rear frame members adjacent to the front and rear edges of the chair: a completely assembled spring cushion unit adapted to be placed in the chair frame as a unit, said spring cushion unit comprising a sub-frame including a plurality of substantially parallel fore and aft supporting bars having bearing members at their rear ends adapted to have points of rockable bearing support on said rear main frame member whereby the front end of said sub-frame can swing upwardly and downwardly about said points of rockable bearing support, leaf spring means carried by the front end of said sub-frame adapted to bear against said front main frame member so as to afford a vertically movable free floating mounting of the front edge of said sub-frame, a section of wire netting extending across the top of said sub-frame, helical tension springs connecting said wire netting with said sub-frame, and leaf spring means connected between said wire netting and said fore and aft supporting bars.

9. As an article of manufacture for use in the main frame of a chair having front and rear frame members adjacent to the front and rear edges of the chair: a completely assembled spring cushion unit adapted to be placed in the chair frame as a unit, said spring cushion unit comprising a sub-frame having bearing members at its rear end adapted to have points of rockable bearing support on said rear main frame member whereby the front end of said sub-frame can swing upwardly and downwardly about said points of rockable bearing support, leaf spring means carried by the front end of said sub-frame adapted to bear against said front main frame member so as to afford a vertically movable free floating mounting of the front edge of said sub-frame, a section of wire netting extending across the top of said sub-frame, helical tension springs connecting one edge of said netting with said sub-frame, and leaf springs connecting the other edge of netting with said sub-frame.

10. As an article of manufacture for use in the main frame of a chair having front and rear frame members adjacent to the front and rear edges of the chair: a completely assembled spring cushion unit adapted to be placed in the chair frame as a unit, said spring cushion unit comprising a sub-frame having bearing members at its rear end adapted to have points of rockable bearing support on said rear main frame member whereby the front end of said sub-frame can swing upwardly and downwardly about said points of rockable bearing support, spring means effective between the front portion of said sub-frame and said main frame so that the front edge of said sub-frame can have a vertically movable floating movement, a flexible seat surface extending across said sub-frame, and helical tension springs connected between said flexible seat surface and said sub-frame.

GUSTAVE P. JOHNSON.

REFERENCES CITED

The following references are of record in the file of this patent:

UNITED STATES PATENTS

| Number | Name | Date |
|---|---|---|
| 53,888 | Schimming | Apr. 10, 1866 |
| 108,966 | Carl | Nov. 8, 1870 |
| 126,675 | Clark | May 14, 1872 |
| 534,610 | Mafera | Feb. 19, 1895 |
| 1,138,986 | Sisbower et al. | May 11, 1915 |
| 1,147,771 | Warner | July 27, 1915 |
| 2,155,792 | Johnson | Apr. 25, 1939 |

FOREIGN PATENTS

| Number | Country | Date |
|---|---|---|
| 261,294 | Great Britain | Nov. 18, 1926 |
| 372,778 | Great Britain | May 11, 1932 |
| 609,122 | Germany | Feb. 7, 1935 |